US009025475B1

(12) United States Patent
Sorenson et al.

(10) Patent No.: US 9,025,475 B1
(45) Date of Patent: May 5, 2015

(54) PROACTIVELY RETRANSMITTING DATA PACKETS IN A LOW LATENCY PACKET DATA NETWORK

(75) Inventors: James Christopher Sorenson, Seattle, WA (US); Douglas S. Laurence, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 512 days.

(21) Appl. No.: 13/350,925

(22) Filed: Jan. 16, 2012

(51) Int. Cl.
 *H04L 1/00* (2006.01)
 *H04L 1/18* (2006.01)
 *H04L 1/16* (2006.01)

(52) U.S. Cl.
 CPC ............ *H04L 1/1848* (2013.01); *H04L 1/1858* (2013.01); *H04L 1/1685* (2013.01)

(58) Field of Classification Search
 None
 See application file for complete search history.

(56) References Cited

U.S. PATENT DOCUMENTS

| | | | |
|---|---|---|---|
| 6,493,318 B1* | 12/2002 | Bare | 370/238 |
| 6,580,715 B1* | 6/2003 | Bare | 370/396 |
| 6,865,160 B1* | 3/2005 | Bare | 370/256 |
| 7,010,607 B1* | 3/2006 | Bunton | 709/228 |
| 7,359,326 B1* | 4/2008 | Harper et al. | 370/235 |
| 7,940,771 B2* | 5/2011 | Lee et al. | 370/394 |
| 8,151,155 B2* | 4/2012 | Rao et al. | 714/748 |
| 8,498,359 B2* | 7/2013 | Lauer et al. | 375/267 |
| 2002/0073225 A1* | 6/2002 | Dillon et al. | 709/233 |
| 2003/0018794 A1* | 1/2003 | Zhang et al. | 709/231 |
| 2003/0022628 A1* | 1/2003 | Mamiya et al. | 455/67.1 |
| 2003/0043744 A1* | 3/2003 | Lu et al. | 370/236 |
| 2003/0053475 A1* | 3/2003 | Veeraraghavan et al. | 370/431 |
| 2003/0081664 A1* | 5/2003 | Lu et al. | 375/222 |
| 2003/0123481 A1* | 7/2003 | Neale et al. | 370/466 |
| 2003/0179742 A1* | 9/2003 | Ogier et al. | 370/351 |
| 2004/0054796 A1* | 3/2004 | Kikuchi et al. | 709/229 |
| 2004/0062267 A1* | 4/2004 | Minami et al. | 370/463 |
| 2004/0174816 A1* | 9/2004 | Stewart et al. | 370/235 |
| 2004/0192312 A1* | 9/2004 | Li et al. | 455/445 |
| 2005/0053084 A1* | 3/2005 | Abrol et al. | 370/412 |
| 2005/0074007 A1* | 4/2005 | Samuels et al. | 370/392 |
| 2005/0216911 A1* | 9/2005 | Yen et al. | 717/176 |
| 2005/0265383 A1* | 12/2005 | Melpignano et al. | 370/465 |
| 2006/0123119 A1* | 6/2006 | Hill et al. | 709/227 |
| 2006/0146762 A1* | 7/2006 | Kuroda et al. | 370/335 |
| 2006/0262799 A1* | 11/2006 | Biran et al. | 370/395.52 |
| 2006/0268887 A1* | 11/2006 | Lu et al. | 370/394 |
| 2007/0027976 A1* | 2/2007 | Sasame et al. | 709/223 |
| 2007/0115814 A1* | 5/2007 | Gerla et al. | 370/230 |
| 2007/0206497 A1* | 9/2007 | Plamondon et al. | 370/231 |
| 2007/0206615 A1* | 9/2007 | Plamondon et al. | 370/401 |

(Continued)

*Primary Examiner* — Phirin Sam
*Assistant Examiner* — Faiyazkhan Ghafoerkhan
(74) *Attorney, Agent, or Firm* — Lee & Hayes, PLLC

(57) ABSTRACT

The concepts and technologies disclosed herein take advantage of the low latency in high-speed local area networks to retransmit more quickly than waiting for a computer to acknowledge a packet on a high latency network, such as the Internet, or waiting for a retransmit timeout. For instance, if a first computer operating in a local area network detects that a data packet has not yet been received by an outgoing network edge component within an expected time period, the first computer can infer that the data packet has not yet reached a second computer. In response, the first computer can retransmit the packet to the outgoing network edge component without the second computer being aware of the lost packet. Also, within a local area network, an incoming network edge component can preserve packets in a data buffer in case the first computer indicates it did not receive a packet.

20 Claims, 7 Drawing Sheets

(56) References Cited

U.S. PATENT DOCUMENTS

| | | | |
|---|---|---|---|
| 2007/0291778 A1* | 12/2007 | Huang et al. | 370/410 |
| 2008/0002610 A1* | 1/2008 | Zheng et al. | 370/328 |
| 2008/0219204 A1* | 9/2008 | Lee et al. | 370/315 |
| 2009/0067416 A1* | 3/2009 | Tavares et al. | 370/355 |
| 2009/0161680 A1* | 6/2009 | Ishikawa et al. | 370/400 |
| 2009/0307557 A1* | 12/2009 | Rao et al. | 714/749 |
| 2010/0037116 A1* | 2/2010 | Grove et al. | 714/749 |
| 2010/0091759 A1* | 4/2010 | Stahl et al. | 370/347 |
| 2010/0180113 A1* | 7/2010 | Graffi et al. | 713/153 |
| 2010/0202314 A1* | 8/2010 | Hauck et al. | 370/252 |
| 2010/0254580 A1* | 10/2010 | Plamondon | 382/124 |
| 2010/0303053 A1* | 12/2010 | Akbari et al. | 370/345 |
| 2011/0044338 A1* | 2/2011 | Stahl et al. | 370/392 |
| 2011/0078528 A1* | 3/2011 | Ohtaki | 714/748 |
| 2011/0141989 A1* | 6/2011 | Kondo | 370/329 |
| 2012/0278804 A1* | 11/2012 | Narayanasamy et al. | 718/1 |

* cited by examiner

PROACTIVELY RETRANSMITTING DATA PACKETS IN A LOW LATENCY PACKET DATA NETWORK

BACKGROUND

In computer networking, a transport protocol provides communication between applications residing in different hosts. The transport protocol used in the Internet and similar networks is Transmission Control Protocol ("TCP"). TCP provides reliable transport of data between hosts, in part, by establishing that a source host must require an acknowledgment from a destination host whenever a data packet is received. If the source host does not receive that acknowledgement within a certain amount of time called a retransmission delay, the source host acts under the assumption that the data packet did not reach the destination host and retransmits the data packet. The retransmission delay in TCP is typically 200 milliseconds ("ms").

In a traditional scenario for communications between a client and a server, the client sends packets to an Internet service provider ("ISP"), which, in turn, sends the packets over transit links to the server. The server may be part of a data center and may operate on a high-speed local area network ("LAN"). The server tracks the packets it needs to transmit back to the client using TCP windowing. When the client acknowledges certain packets, it informs the server of what packets it has seen so far in the packet flow. For example, if the server has sent 100 bytes and the client acknowledges 50 bytes, this signifies to the Web server that the client has seen the first 50 bytes. In the current flow of TCP, the server would only retransmit if it does not receive an acknowledgement from all 100 bytes. This can result in the client experiencing undesirable delays in receiving data from the server.

It is with respect to these and other considerations that the disclosure made herein is presented.

DETAILED DESCRIPTION

Figure 1:
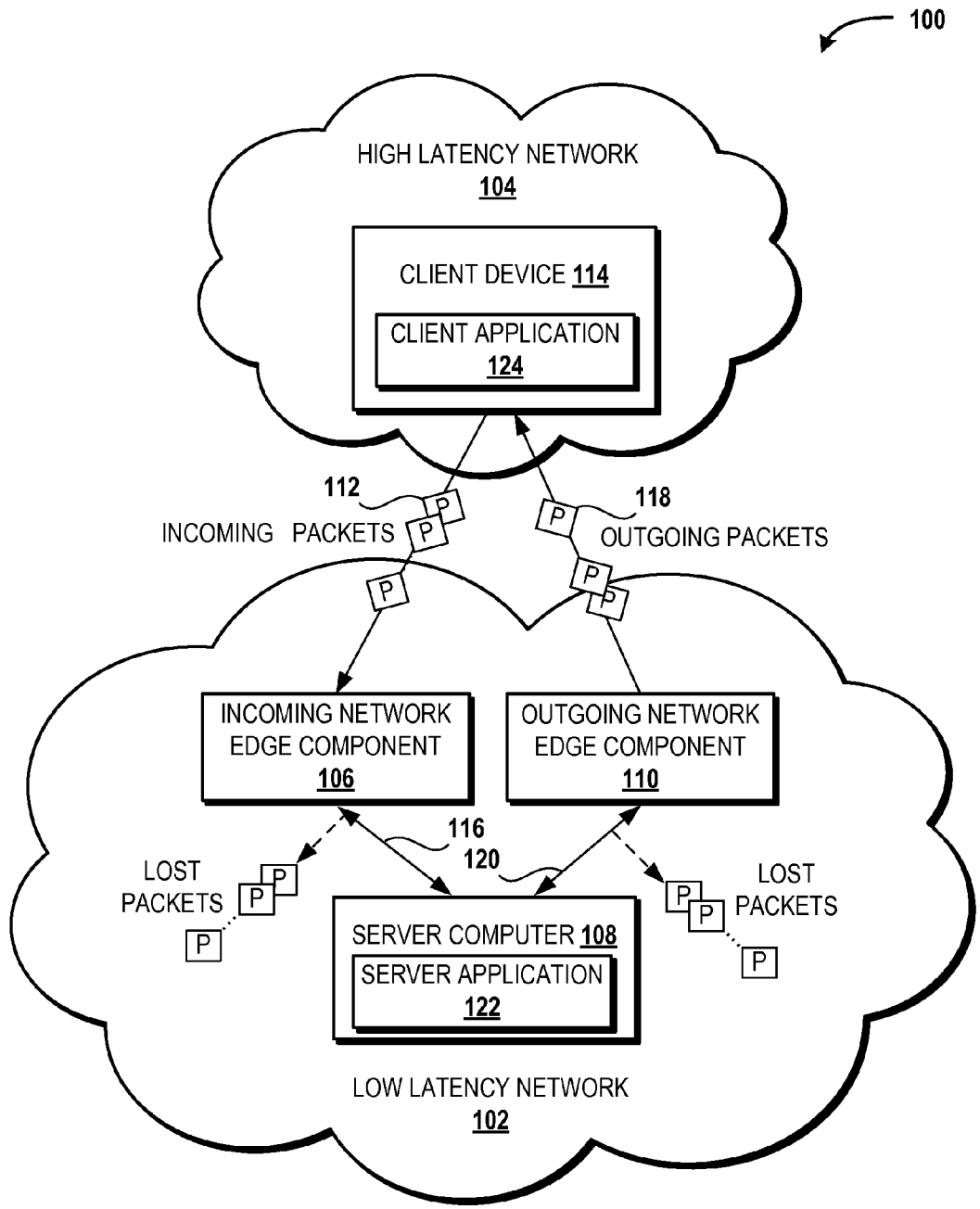
FIG. 1 is a system and network diagram showing aspects of an illustrative operating environment for implementing various embodiments presented herein.

The following detailed description is directed to concepts and technologies for proactively retransmitting data packets in a low latency data network to mitigate the effects of packet loss. When a server has an unacknowledged data packet to be sent to a client, there can be two reasons why the data is not acknowledged: 1) an acknowledgment message ("ACK") has not completed its round trip from the client, or 2) the packet was lost in transit. According to one aspect disclosed herein, if the server has waited for an ACK for an expected period of time, but has not yet received the ACK, and has not yet waited for a retransmit timeout, the server can query an outgoing network edge component for the acknowledgment number associated with the last packet sent to the client. If the outgoing network edge component does not have the correct ACK number, the server can correctly infer that the packet has been lost in transit from the server to the outgoing network edge component and retransmit the packet to the outgoing network edge component for delivery to the client. If the outgoing network edge component has the correct ACK number, then the ACK may be in transit or may have been dropped. In these instances, the server can wait for the retransmit timer in accordance with the normal retransmission procedure of TCP protocol.

According to another aspect disclosed herein, the interaction between an incoming network edge component and the server is analogous to the interaction described above between the outgoing network edge component and the server. However, according to this aspect, the incoming network edge component is configured to preserve packets in a data buffer in case the server requests that the packet be retransmitted.

The concepts and technologies disclosed herein take advantage of the low latency in high-speed LANs to retransmit more quickly than waiting for a client to acknowledge a packet on a high latency network, such as the Internet, or waiting for a retransmit timeout. For instance, if a server operating in a LAN can detect that a particular data packet has not yet been received by an outgoing network edge component within an expected time period and thereby infer that the data packet has not yet reached the client, the server can retransmit the packet to the outgoing edge network edge component without the client being aware of the lost packet.

It should be appreciated that the embodiments disclosed herein might be utilized with any type of computer, computing system, device, Web site, application program, operating system, or other type of system or component. Accordingly, although the embodiments disclosed herein are primarily presented in the context of a low latency LAN of a data center, such as a data center supporting an e-commerce Web site, that embodies the concepts disclosed herein for proactively retransmitting data packets, the disclosure presented herein is not limited to such an implementation. For instance, the embodiments disclosed herein might be utilized in a similar fashion to proactively retransmit data packets within a first network that is configured to, using one or more network components, transmit data packets to a destination that is operating on or in communication with a second network that has higher latency than the first network.

It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein may be presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several components for proactively retransmitting data packets within a low latency data communications network ("low latency network") 102. As discussed above, the environment 100 is merely illustrative and the embodiments disclosed herein might be utilized in many different types of environments.

In the illustrated embodiment, the low latency network 102 is in communication with a high latency data communication network ("high latency network") 104 to exchange data enclosed in data packets. The low latency network 102 and the high latency network 104 are considered low and high latency with respect to one another. In other words, the low latency network 102 has a lower latency than the high latency network 104. More particularly, data links between the components of the low latency network 102 generally provide lower latency data connections than the data links between the components of the high latency network 104. Accordingly, although the terms "high latency" and "low latency" are used herein, these terms are not used to generically quantify the actual or estimated latency experienced or expected on data links between any specific components within the illustrated networks. Instead, these terms are merely used to identify one network as having lower latency than the other.

It should be understood that, for various factors including, but not limited to, network load, network topography, network component hardware, software, and/or firmware specifications, network location, and/or environmental conditions, one or more data links within the low latency network 102 may be, at a particular time, higher latency than one or more data links within the high latency network 104. In these instances, the various concepts and technologies disclosed herein may still effectively mitigate the effects of packet loss, although potentially to a lesser extent.

The illustrated low latency network 102 includes an incoming network edge component 106, a server computer 108, and an outgoing network edge component 110. The incoming network edge component 106 may be an edge router, a network load balancer, a server computer, any combination thereof, or any other type of network component configured to receive incoming packets 112 from a client device 114 operating on or in communication with the high latency network 104, and transmit the incoming packets 112 to the server computer 108 via a first logical data link 116. In some embodiments, as will be described in greater detail herein, the incoming network edge component 106 is configured to store a data buffer and selectively retransmit one or more data packets stored in the data buffer in response to the server computer 108 providing an indication that it did not receive the data packets. In some embodiments, the server computer 108 provides such an indication in response to a query received from the incoming network edge component 106 after a specified period of time has expired.

The outgoing network edge component 110 may be an edge router, a server computer, a network load balancer, any combination thereof, or any other type of network component configured to transmit outgoing packets 118 received from the server computer 108 via a second logical data link 120. In some embodiments, as will be described in greater detail herein, the outgoing network edge component 110 is configured to receive a query from the server computer 108 regarding whether or not the outgoing network edge component 110 has the correct ACK number for a particular packet the server computer 108 sent to the outgoing network edge component 110 for transmission to the client device 114. In these embodiments, in response to receiving a query response indicating that the outgoing network edge component 110 does not have the correct ACK number for the packet, the server computer 108 retransmits the packet to the outgoing network edge component 110, thereby reducing the delay typical of waiting for a retransmit timeout in TCP.

In some embodiments, the incoming network edge component 106 and the outgoing network edge component 110 are combined in a single network edge component. The combined network edge component may be an edge router, a server computer, a network load balancer, any combination thereof, or any other type of network component configured to perform the operations performed by the incoming network edge component 106 and the outgoing network edge component 110, as described above and as described in greater detail herein below. Additionally or alternatively, in some embodiments, the incoming network edge component 106 and/or the outgoing network edge component 110 operate on or in communication with another network (not shown) that is in communication with the low latency network 102 and the high latency network 104. In these embodiments, the data connections between the other network and the low latency network 102 are configured such that the latency between the network edge components 106, 110 and the server computer 108 is no greater than the latency for implementations in which the incoming network edge component 106 and/or the outgoing network edge component 110 are operating on the low latency network 102. Alternatively, the data connections between the other network and the low latency network 102 provide latency between the network edge components 106, 110 and the server computer 108 that is within a maximum allowable latency. Generally, the latency of any of these network configurations is less than the round trip latency experienced in waiting for a delay ACK response from the client device 114 or reaching a retransmit timeout.

The first logical data link 116 and the second logical data link 120 are illustrated as being a single direct connection between the incoming network edge component 106 and the server computer 108 and between the outgoing network edge component 110 and the server computer 108, respectively.

This configuration is illustrated for ease of illustration and explanation and is not intended to limit the possible connection configurations to a single connection. Instead, the first logical data link 116 and/or the second logical data link 120 may include multiple physical data links operating in accordance with any physical layer standards such as, but not limited to, Institute of Electrical and Electronics Engineers ("IEEE") 802 family of standards for LANs. Moreover, the physical data links may include links to/from one or more routers, hubs, gateways, or other network components that collectively provide the logical data links 116, 120. The particular details of the physical data links between the edge components 106 and the server computer 108 are beyond the scope of this application.

The server computer 108 may be a personal computer ("PC"), desktop workstation, laptop computer, tablet computer, notebook computer, personal digital assistant ("PDA"), electronic-book reader, game console, set-top box, consumer electronics device, server computer, or any other type of computing device configured to connect to the incoming network edge component 106 and to the outgoing network edge component 110. The illustrated server computer 108 includes a server application 122. In some embodiments, the server application 122 is or includes a Web server application configured to deliver Web site content to the client device 114. In particular, the Web server application may host a Web site or a portion thereof, may receive requests for Web pages of the Web site from the client device 114, and may deliver the Web pages to the client device 114 in response thereto. A Web site hosted by the server computer 108 may include content related to any topic. For instance, the Web site may provide online shopping services for an e-commerce merchant. In some embodiments, the server application 122 is or includes an application server configured to host one or more applications such as, but not limited to, productivity applications, email applications, video game servers, video and/or music download applications, and streaming video and/or music applications. In some embodiments, the server application 122 is or includes a data storage server configured to store, locally or remotely, on one or more data stores (not shown), content and to deliver the content to the client device 114 upon request. In some embodiments, the server application 122 combines the functionality of any of the aforementioned server types. Other server types are contemplated. Moreover, the server computer 108 may be part of a server farm, a server cluster, or a server cluster within a server farm.

The client device 114 may be a PC, desktop workstation, laptop computer, tablet computer, notebook computer, personal digital assistant PDA, electronic-book reader, game console, set-top box, consumer electronics device, server computer, or any other type of computing device configured to connect to the low latency network 102 via the high latency network 104. The illustrated client device 114 includes a client application 124. In some embodiments, the client application 124 is or includes program code that executes within an environment provided by a Web browser application, such as the MOZILLA® FIREFOX® Web browser from MOZILLA FOUNDATION of Mountain View, Calif. The client application 124 exchanges data with the server application 122 operating in the server 108 using the Hypertext Transfer Protocol ("HTTP") or another appropriate protocol over the high latency network 104 and the low latency network 102 via a connection established between the client device 114 and the server computer 108 using TCP or another appropriate protocol. The client application 124, in some embodiments, is or includes a stand-alone client application configured for communicating with the server application 122. The client application 124 might also utilize any number of communication methods known in the art to communicate with the server application 122 across the networks 102, 104, including remote procedure calls, Simple Object Access Protocol ("SOAP")-based Web services, remote file access, proprietary client-server architectures, and the like.

The client device 114 may be operated by a user. The user 102 may also be referred to herein as a "visitor" to a Web site provided by the server application 122 or a "customer" of a service provided, at least in part, by the server application 122.

It should be understood that although FIG. 1 illustrates the server computer 108 operating as a server and the client device 114 operating as a client, in some embodiments, the client device 114 operates as a server and the server computer 108 operates as a client. In some embodiments, the roles of client and server change as the server computer 108 and the client device 114 communicate in various scenarios. As such, FIG. 1 should not be construed as limiting the client/server functionality to the illustrated embodiment.

As briefly described above, in some embodiments, the incoming network edge component 106 and/or the outgoing network edge component 110 are load balancers. The load balancers may be part of a distributed load balancer. As a load balancer, the incoming network edge component 106 may use asymmetric paths, which may include multiple physical data links, through the low latency network 102 to route requests received from the client device 114 to the server computer 108 and/or other server computers (not shown) in accordance with a load balancing scheme. The asymmetric nature of this traffic makes packet loss a more difficult process to detect. Packet loss is similarly difficult to detect between the server computer 108 and the outgoing network edge component 110. The methods for proactively retransmitting data packets described in greater detail below are directed to, in part, mitigating this packet loss.

Figure 2:
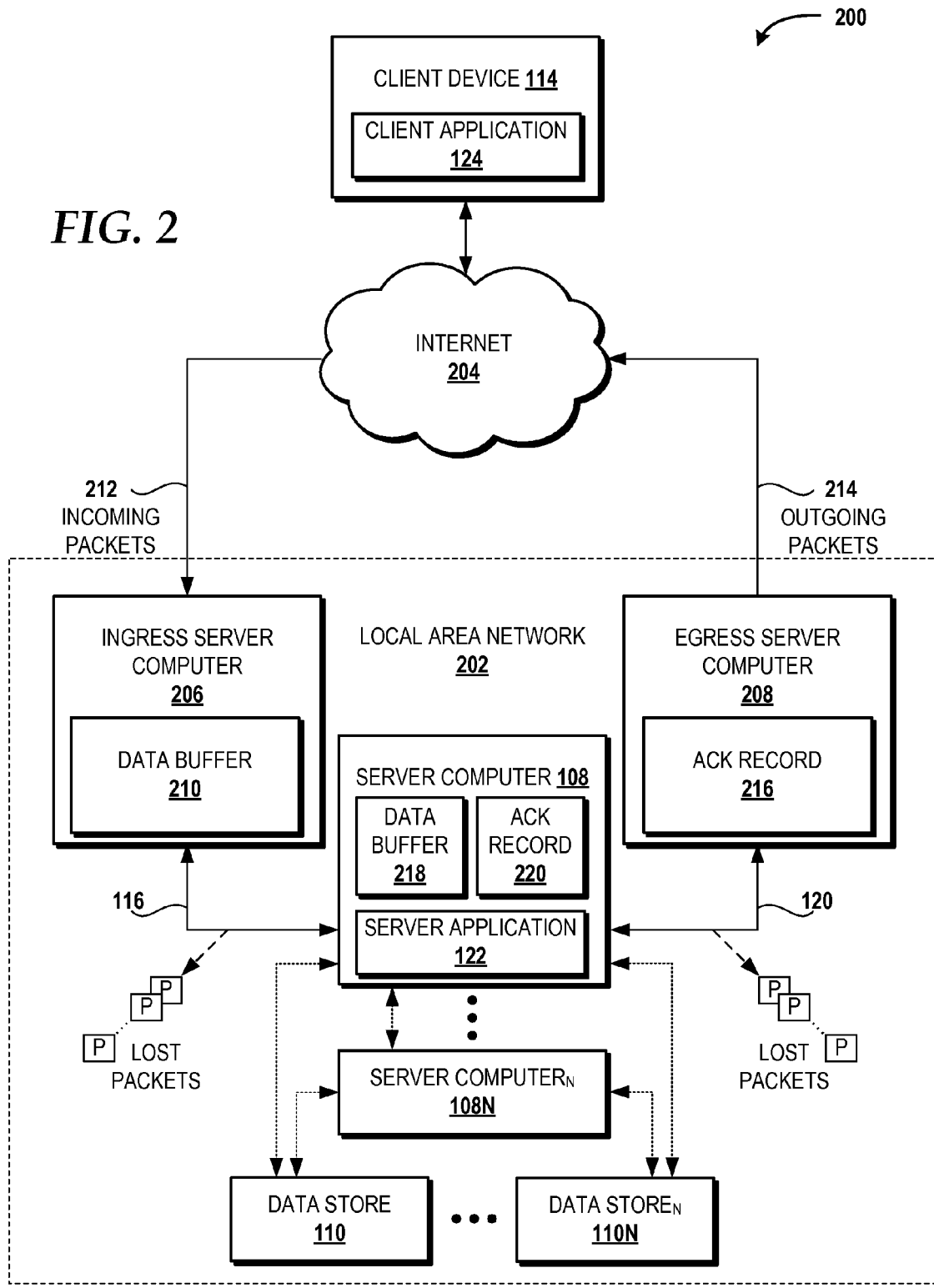
FIG. 2 is another system and network diagram showing aspects of an illustrative operating environment for implementing various embodiments presented herein.

Turning now to FIG. 2, the following description is intended to provide a brief, general description of another suitable computing environment in which the embodiments described herein may be implemented. In particular, FIG. 2 is a system and network diagram that shows an illustrative operating environment 200 including several components for proactively retransmitting data packets within a low latency LAN 202 ("LAN 202"). The environment 200 includes many of the elements described above. These elements are not described in detail again here. The environment 200 is merely illustrative and the embodiments disclosed herein might be utilized in many different types of environments.

In the illustrated embodiment, the client device 114 is in communication with the Internet 204, such as through an Internet service provider's network (not shown) or other access network including wired or wireless data access networks. The wireless data access networks may utilize a wireless data network access technology such as, but not limited to, WI-FI, WI-MAX, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), Long-Term Evolution ("LTE"), and various other current and future wireless data access standards. In the illustrated embodiment, the Internet 204 is presumed to have a higher latency than the LAN 202. In some embodiments, the LAN 202 is a network in a data center. In some embodiments, the data center is configured to facilitate operations associated with an e-commerce Web site. The LAN 202 is in communication with the Internet 204 to exchange data enclosed in data packets.

The LAN 202 includes an ingress server computer 206, the server computer 108, one or more server computers 108N, one or more data stores 110, 110N, and an egress server computer 208. The ingress server computer 206 is provided as but one embodiment of the incoming network edge component 106. The ingress server computer 206 includes a data buffer 210 for buffering data packets in accordance with various embodiments described herein. In particular, the ingress server computer 206 is configured to receiving incoming packets 212 from the Internet 204, store the packets in the data buffer 210, send the packets to the server computer 108, and selectively retransmit the packets to the server computer 108.

The egress server computer 208 is provided as but one embodiment of the outgoing network edge component 110. The egress server computer 208 is configured to receive packets from the server computer 108 and send the packets as outgoing packets 214 to the Internet 204 for delivery to the client device 114. The egress server computer 208 includes an acknowledgement record 216 for storing ACK numbers for data packets sent to the client device 114. The ACK numbers are 32-bit numbers included in a TCP header. If an ACK flag is set for a particular data packet, then the value of the ACK field within the TCP header is the next sequence number that the egress server computer 208 is expecting to receive. This acknowledges all prior bytes, if any. The first ACK sent by each host within a given TCP connection acknowledges the other host's initial sequence number itself, but does not acknowledge data.

In accordance with one aspect disclosed herein, the egress server computer 208 is configured to receive data packets from the server computer 108 and/or the server computer(s) 108N and to store the ACK number associated with those packets such that if the server computer 108 queries the egress server computer 208 for the last packet that the egress server computer 208 sent to the client device 114, the egress server computer 208 can retrieve that ACK number and send it to the server computer 108. If the ACK number for the last packet matches the ACK number for the last packet the server computer 108 sent to the egress server computer 208, the server computer 108 can infer that the packet successfully reached the egress server computer 208. If, however, the ACK number for the last packet does not match the ACK number for the last packet the server computer 108 sent to the egress server computer 208, the server computer 108 can infer that the packet did not successfully reach the egress server computer 208 and retransmit the last packet to the egress server computer 208.

The illustrated server computer 108 includes a data buffer 218 for buffering data packets in accordance with the various embodiments described herein. In particular, the data buffer 118 is configured to store data packets for retransmission to the egress server computer 208 if the ACK number received from the egress server computer 208 for the last packet does not match the ACK number for the last packet the server computer 108 sent to the egress server computer 208.

The illustrated server computer 108 also includes an acknowledgement record 220 for storing ACK number for data packets received sent to the egress server computer 208. In this manner, the server computer 108 can respond to queries received from the ingress server computer 206 in regard to whether or not the server computer 108 received a particular data packet.

The server computers 108, 108N are illustrated as being in communication with the one or more data stores 110, 110N. The data stores 110, 110N may be configured to store any information that is accessible by the server computers 108, 108N for providing to the client device 114. In some embodiments, the data stores 110, 110N are configured to store customer profile information for customers of an e-commerce Web site served by the server computers 108, 108N. Each customer profile may store information about a customer of the e-commerce Web site, such as the customer's name, address, credit card information, browsing and purchase history, preferences, and other information. In some embodiments, the data stores 110, 110N are configured to store email, documents, music, movies, ringtones, software applications, video games, and other like content. In some embodiments, the data stores 110, 1110N are configured to store Web site resources such as Web pages, images, text files, program code for generating Web pages, metadata, scripts, executable code, and other types of data utilized to create and/or provide a Web page.

It should be understood that although FIG. 2 illustrates the server computer 108 operating as a server and the client device 114 operating as a client, in some embodiments, the client device 114 operates as a server and the server computer 108 operates as a client. In some embodiments, the role of client and server changes as the server computer 108 and the client device 114 communicate in various scenarios. As such, FIG. 2 should not be construed as limiting the client/server functionality to the illustrated embodiment.

Figure 3A:
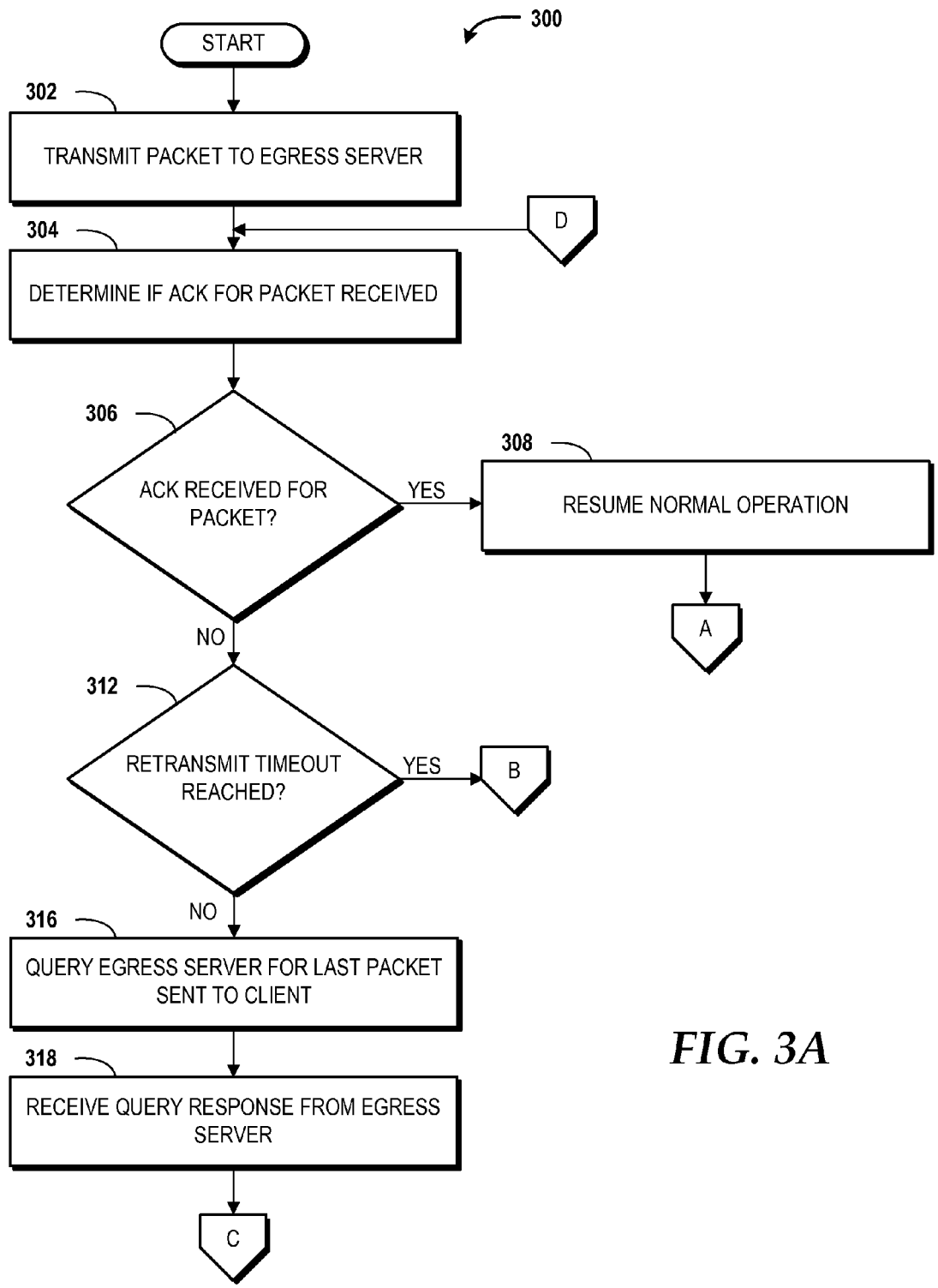
FIGS. 3A-3B are flow diagrams showing aspects of a method for mitigating the effects of packet loss between a server computer and an outgoing network edge component, such as an egress server, in a low latency data communications network by proactively retransmitting packets, according to an illustrative embodiment.
Figure 3B:
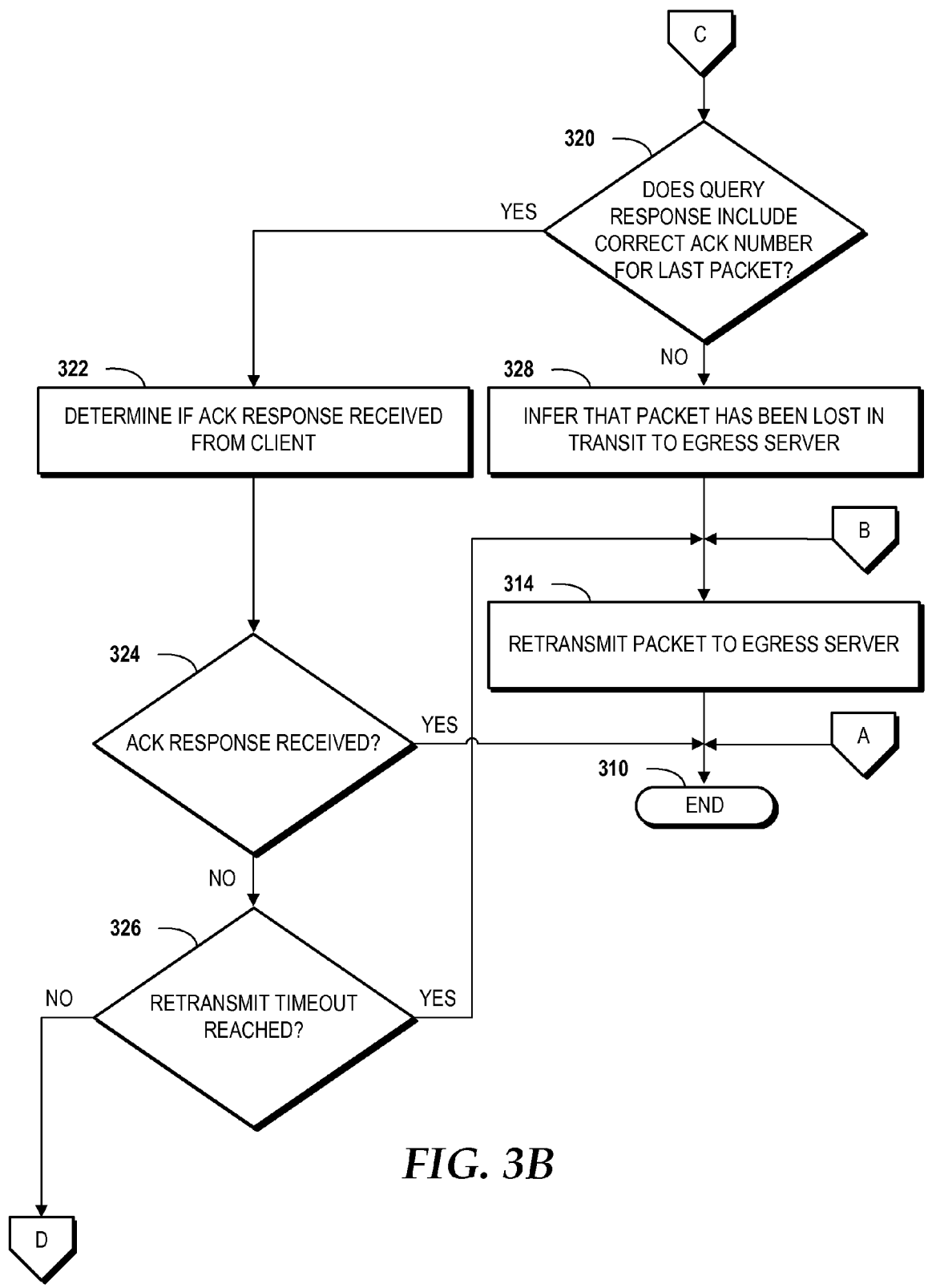

Turning now to FIGS. 3A and 3B, aspects of a method 300 for mitigating the effects of packet loss between a server computer and an outgoing network edge component in a low latency data communications network will be described in detail, according to an illustrative embodiment. The method 300 will be described with reference to FIG. 2 and, particularly, the operations for mitigating the effects of packet loss between the server computer 108 and the egress server computer 208.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The method 300 begins and proceeds to operation 302, wherein the server computer 108 transmits one or more packets to the egress server computer 208 for delivery to the client device 114. For ease of explanation and not limitation, a single packet will be referenced for the remaining description of the method 300. The server computer 108 may transmit the packet in response to receiving a request from the client device 114 as provided to the server computer 108 by the ingress server computer 206. The packet may include data associated with an appropriate response to the request. For instance, the packet may include Web page data or other requested content. From operation 302, the method 300 proceeds to operation 304, wherein the server computer 108 determines if an ACK for the packet has been received. The method 300 then proceeds to operation 306.

At operation 306, if an ACK for the packet was received, the method 300 proceeds to operation 308, wherein the server computer 108 resumes normal operation. For instance, at operation 308, the server computer 108 may wait for a retransmit timeout before attempting to retransmit the packet. The method 300 then proceeds to operation 310 in FIG. 3B and the method 300 ends.

At operation 306, if an ACK for the packet was not received, the server, the method 300 proceeds to operation 312, wherein the server computer 108 determines if the retransmit timeout has been reached. The retransmit timeout may be set at 200 ms or some other time period that is greater than the time period used herein for proactive retransmission. If, at operation 312, the server computer 108 determines that the retransmit timeout has been reached, the method 300 proceeds to operation 314 in FIG. 3B, wherein the server computer 108 retransmits the packet to the egress server computer 208. The egress server computer 208, in turn, and assuming successful receipt of the packet, transmits the packet to the client device 114 via the Internet 204. The method 300 then proceeds to operation 310 and the method 300 ends.

If, at operation 312, the server computer 108 determines that the retransmit timeout has not been reached, the method 300 proceeds to operation 316, wherein the server computer 108 generates and sends a query to the egress server computer 208. The query includes a request for the ACK number of the last packet the egress server computer 208 sent to the client device 114. At operation 318, the server computer 108 receives a query response from the egress server computer 208. In some instances, the query response will not include any ACK number, such as if the egress server computer 208 has not yet sent any packets to the client device 114. This would indicate to the server computer 108 that the packet the server computer 108 transmitted to the egress server computer 208 at operation 302 did not reach the egress server computer 208. In other instances, the query response will include the ACK number associated with the packet the server computer 108 transmitted to the egress server computer 208 at operation 302. This would indicate to the server computer 108 that the packet did reach the egress server computer 208. In still other instances, the query response will include the ACK number associated with another packet the server computer 108 transmitted to the egress server computer 208 before or after the server computer 108 transmitted the packet to the egress server computer 208 at operation 302. This would indicate to the egress server computer 208 that the packet the server computer 108 transmitted to the egress server computer 208 at operation 302 did not reach the egress server computer 208. In any case, the method 300 proceeds to operation 320 in FIG. 3B, wherein the server computer 108 determines if the query response includes the correct ACK number for the packet.

If, at operation 320, the server computer 108 determines that the query response includes the correct ACK number for the packet, the method 300 proceeds to operation 322, wherein the server computer 108 determines if an ACK response has been received from the client device 114. The method 300 then proceeds to operation 324. At operation 324, if an ACK response has been received, the method 300 proceeds to operation 310 and the method 300 ends. At operation 320, if an ACK response has not been received, the method 300 proceeds to operation 326.

At operation 326, the server computer 108 determines if a retransmit timer has timed out. If the retransmit timer has not timed out, the method 300 returns to operation 304 shown in FIG. 3A. If the retransmit timer has timed out, the method 300 proceeds to operation 314, wherein the server computer 108 retransmits the packet to the egress server computer 208. The egress server computer 208, in turn, and assuming successful receipt of the packet, transmits the packet to the client device 114 via the Internet 204. The method 300 then proceeds to operation 310 and the method 300 ends.

If, at operation 320, the server computer 108 determines that the query response does not include the correct ACK number for the packet, the method 300 proceeds to operation 328, wherein the server computer 108 infers that the packet has been lost in transit to the egress server computer 208. The method 300 then proceeds to operation 314, wherein the server computer 108 retransmits the packet to the egress server computer 208. The egress server computer 208, in turn, and assuming successful receipt of the packet, transmits the packet to the client device 114 via the Internet 204. The method 300 then proceeds to operation 310 and the method 300 ends.

Figure 4A:
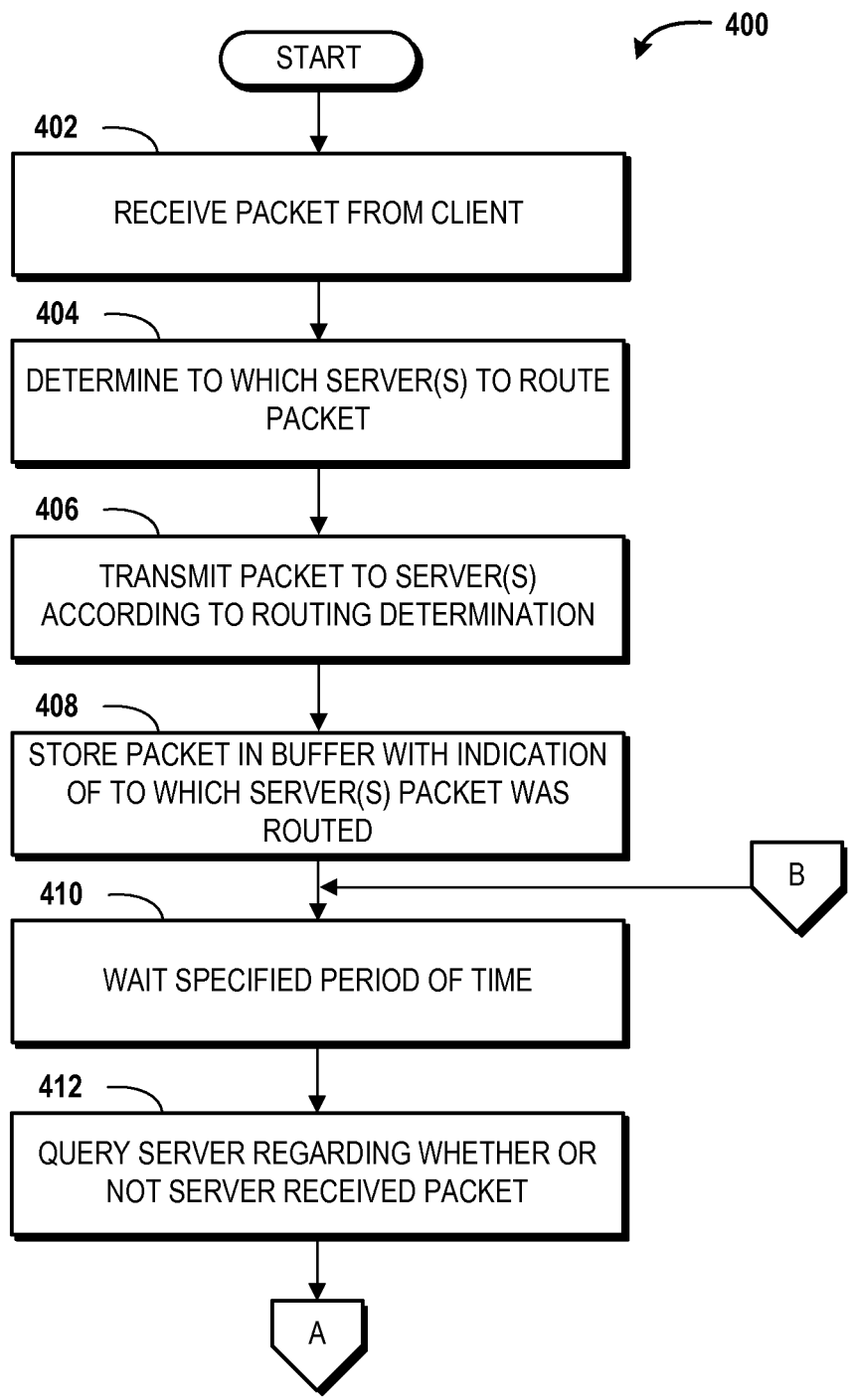
FIGS. 4A-4B are flow diagrams showing aspects of a method for mitigating the effects of packet loss between an incoming network edge component, such as an ingress server, and a server in a low latency data communications network by proactively retransmitting packets, according to an illustrative embodiment.
Figure 4B:
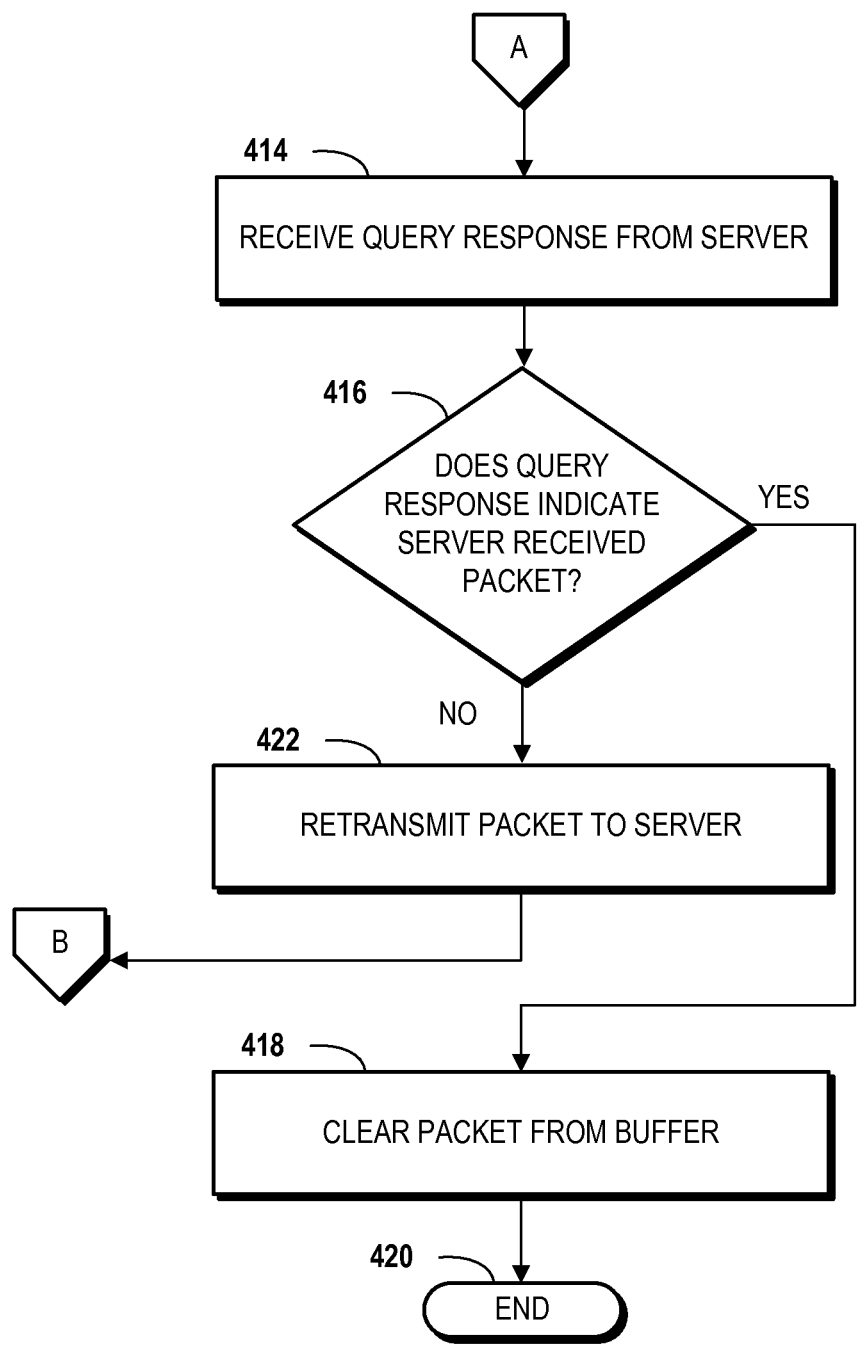

Turning now to FIGS. 4A and 4B, aspects of a method 400 for mitigating the effects of packet loss between an incoming network edge component and a server in a low latency data communications network will be described in detail, according to an illustrative embodiment. The method 400 will be described with reference to FIG. 2 and, particularly, illustrative operations for mitigating the effects of packet loss between the ingress server computer 206 and the server computer 108.

The method 400 begins and proceeds to operation 402, wherein the ingress server computer 206 receives a packet from the client device 114 via the Internet 204. From operation 402, the method 400 proceeds to operation 404, wherein the ingress server computer 206 determines to which of the server computers 110, 110N to route the packet. In some embodiments, the determination at operation 404 is based, at least in part, upon a load balancing scheme that is implemented, at least in part, on the ingress server computer 206. In some embodiments, the determination at operation 404 is based, at least in part, upon a data type associated with data contained within the packet.

From operation 404, the method 400 proceeds to operation 406, wherein the ingress server computer 206 transmits the packet to the server(s) 110, 110N according to the determination. For ease of explanation and not limitation, the remainder of the method 400 will be described in context of the packet having been transmitted to the server computer 108.

The method 400 then proceeds to operation 408, wherein the ingress server computer 206 stores the packet in the data buffer 210. In the illustrated embodiment, the packet is stored in the data buffer 210 with an indication identifying the server computer 108 as being the server to which the packet was routed. In some embodiments, no indication is needed, such as when only a single server is available to which to route the packet. In some embodiments, the indication includes an Internet protocol ("IP") address of the server to which the packet was routed. In other embodiments, the indication includes a data type associated with the data contained in the packet and the data type is sufficient for the ingress server computer 206 to determine to which server the packet was routed. In some embodiments, operation 408 occurs before operation 406.

From operation 408, the method 400 proceeds to operation 410, wherein the ingress server computer 206 waits a specified period of time. The period of time may be of sufficient time to allow the packet to travel to the server computer 108. The period of time may include additional time as needed for a particular implementation. In some embodiments, the period of time is on the order of milliseconds or microseconds. In some embodiments, the period of time is sufficiently short so as to be considered instant or be set to zero. In other words, the method 400 may proceed from operation 408 directly to operation 412. After the specified period of time has expired, the method 400 proceeds to operation 412, wherein the ingress server computer 206 queries the server computer 108 regarding whether or not it received the packet.

From operation 412, the method 400 proceeds to operation 414 shown in FIG. 4B, wherein the ingress server computer 206 receives a query response from the server computer 108. The method 400 then proceeds to operation 416, wherein the ingress server computer 206 determines if the query response indicates that the server computer 108 received the packet. If, at operation 416, the ingress server computer 206 determines that the query response indicates that the server computer 108 received the packet, the method 400 proceeds to operation 418, wherein the ingress server computer 206 clears the packet from the data buffer 210. From operation 418, the method 400 proceeds to operation 420, wherein the method 400 ends.

If, at operation 416, the ingress server computer 206 determines that the query response indicates that the server computer 108 did not receive the packet, the method 400 proceeds to operation 422. At operation 422, the ingress server computer 206 retransmits the packet to the server computer 108. The method 400 then returns to operation 410 shown in FIG. 4A. In the illustrated embodiment, operations 410, 412, 414, 416 repeat until, at operation 416, the ingress server computer 206 determines that the query response indicates that the server computer 108 did receive the packet, at which point the method 400 proceeds to operation 418 and the ingress server computer 206 clears the packet from the data buffer 210.

Figure 5:
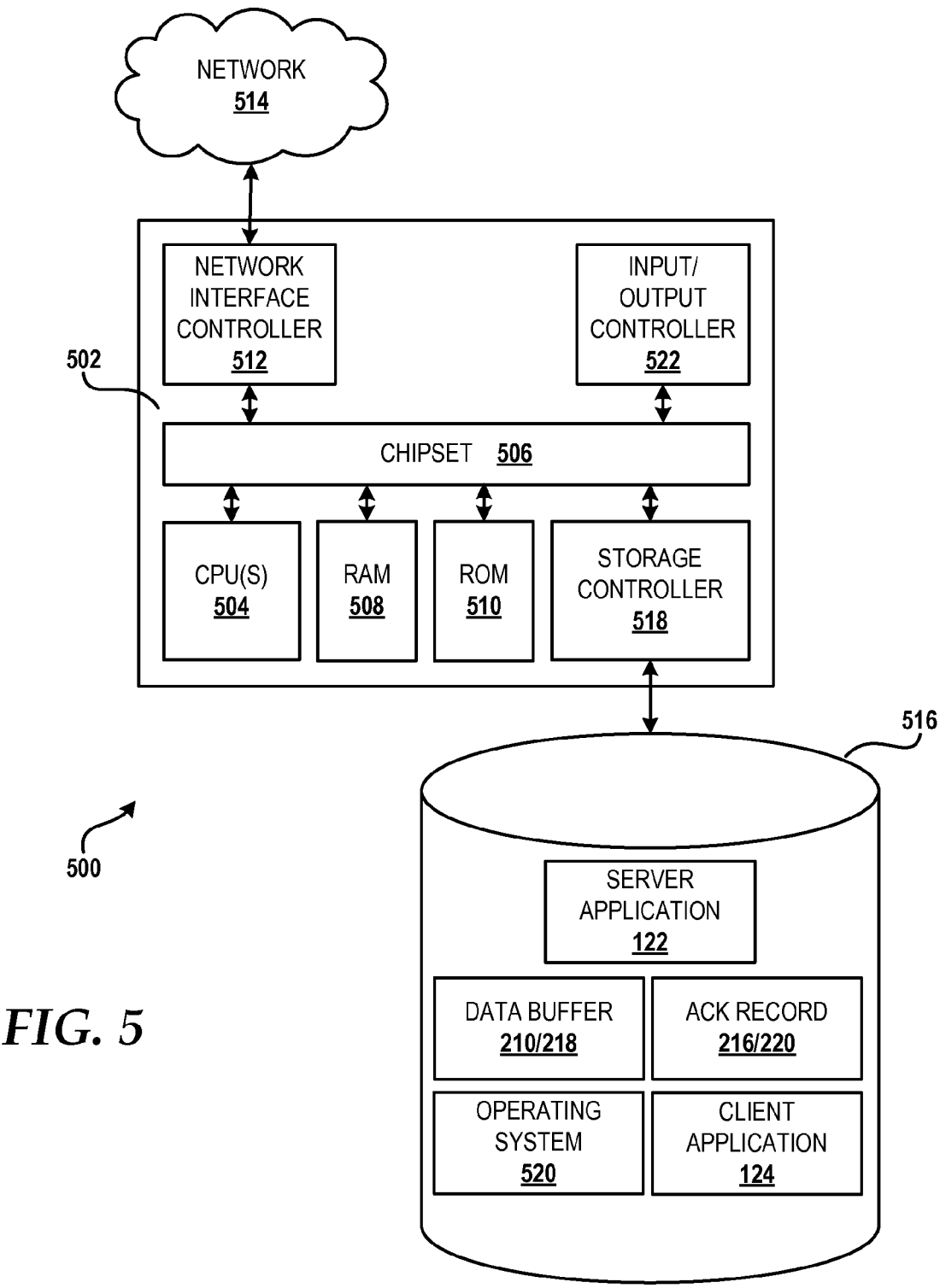
FIG. 5 is a computer architecture diagram showing one illustrative computer hardware architecture for use in computing devices configured to implement the concepts and technologies disclosed herein in one embodiment.

FIG. 5 shows an example computer architecture for a computer 500 capable of executing the software components described herein for proactively retransmitting packets in a low latency data communications network in the manner presented above. The computer architecture 500 shown in FIG. 5 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the incoming network edge component 106, the server computer 108, the outgoing network edge component 110, the client device 114, the ingress server computer 206, the egress server computer 208, or other computing platform.

The computer 500 includes a baseboard 502, or "motherboard," which is a printed circuit board to which a multitude of components or devices may be connected by way of a system bus or other electrical communication paths. In one illustrative embodiment, one or more central processing units ("CPUs") 504 operate in conjunction with a chipset 506. The CPUs 504 are standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 506 provides an interface between the CPUs 504 and the remainder of the components and devices on the baseboard. The chipset 506 may provide an interface to a random access memory ("RAM") 508, used as the main memory in the computer 500. The chipset 506 may further provide an interface to a computer-readable storage medium such as a read-only memory ("ROM") 510 or non-volatile RAM ("NVRAM") for storing basic routines that that help to startup the computer 500 and to transfer information between the various components and devices. The ROM 510 or NVRAM may also store other software components necessary for the operation of the computer 500 in accordance with the embodiments described herein.

According to various embodiments, the computer 500 may operate in a networked environment using logical connections to remote computing devices and computer systems through a network, such as a LAN, a wide-area network ("WAN"), the Internet, or any other networking topology known in the art that connects the computer 500 to remote computers. The chipset 506 includes functionality for providing network connectivity through a network interface controller ("NIC") 512, such as a gigabit Ethernet adapter.

For example, the NIC 512 may be capable of connecting the computer 500 to other computing devices, such as the incoming network edge component 106, the server computer 108, the outgoing network edge component 110, the client device 114, the ingress server computer 206, the egress server computer 208, and the like, over a network 514, such as the low latency network 102, the high latency network 104, the LAN 202, and/or the Internet 204, described above in regard to FIGS. 1 and 2. It should be appreciated that multiple NICs 512 may be present in the computer 500, connecting the computer 500 to other types of networks and remote computer systems.

The computer 500 may be connected to a mass storage device 516 that provides non-volatile storage for the computer. The mass storage device 516 may store system programs, application programs, other program modules, and data, which have been described in greater detail herein. The mass storage device 516 may be connected to the computer 500 through a storage controller 518 connected to the chipset 506. The mass storage device 516 may consist of one or more physical storage units. The storage controller 518 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 500 may store data on the mass storage device 516 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 516 is characterized as primary or secondary storage, or the like.

For example, the computer 500 may store information to the mass storage device 516 by issuing instructions through the storage controller 518 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 516 by detecting the physical states or characteristics of one or more particular locations within the physical storage units.

In addition to the mass storage device 516 described above, the computer 500 might have access to other computer-readable media to store and retrieve information, such as program modules, data structures, or other data. It should be appreciated by those skilled in the art that computer-readable media can be any available media that may be accessed by the computer 500, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 516 may store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 516 may store other system or application programs and data utilized by the computer 500. For instance, when utilized to implement the ingress server computer 206, the mass storage device 516 may store the data buffer 210. When utilized to implement the egress server computer 208, the mass storage device 516 may store the acknowledgement record 216. When utilized to implement the server computer 108, the mass storage device 516 may store the server application 122, the data buffer 218, and/or the acknowledgement record 220. When utilized to implement the client device 114, the mass storage device 516 may store the client application 124.

In one embodiment, the mass storage device 516 or other computer-readable storage media may be encoded with computer-executable instructions that, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions that, when executed by the computer, perform the various routines and operations described herein.

The computer 500 may also include an input/output controller 522 for receiving and processing input from a number of input devices, such as a keyboard, a mouse, a touchpad, a touch screen, an electronic stylus, or other type of input device. Similarly, the input/output controller 522 may provide output to a display device, such as a computer monitor, a flat-panel display, a digital projector, a printer, a plotter, or other type of output device. It will be appreciated that the computer 500 may not include all of the components shown in FIG. 5, may include other components that are not explicitly shown in FIG. 5, or may utilize an architecture completely different than that shown in FIG. 5.

Based on the foregoing, it should be appreciated that technologies for proactively retransmitting data packets within a low latency data communications network have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. An apparatus for proactively retransmitting data packets within a low latency data communications network, the apparatus comprising:
   at least one processor; and
   a non-transitory computer-readable storage medium having instructions stored thereon which, when executed on the at least one processor, causes the apparatus to
      transmit a packet to an egress server computer within the low latency data communications network with instructions to deliver the packet to a client device that is outside of the low latency data communications network;
      in response to determining that a retransmit timeout has been reached, retransmit the packet to the egress server computer;
      in response to determining that the retransmit timeout has not been reached, query the egress server computer for an acknowledgement number for a last packet the egress server computer sent to the client device;
      receive a query response from the egress server computer; and
      in response to determining that the query response does not comprise a correct acknowledgement number for the packet transmitted to the egress server computer, infer that the packet has been lost during transit to the egress server computer, and retransmit the packet to the egress server computer.

2. The apparatus of claim 1, wherein the retransmit timeout is set in accordance with Transfer Control Protocol ("TCP") specifications.

3. The apparatus of claim 1, wherein the egress server computer is queried in response to an expiration of a specified time period that is less than a time needed to reach the retransmit timeout.

4. The apparatus of claim 1, wherein the low latency data communications network is in communication with another data communications network having a latency that is higher than a latency of the low latency data communications network.

5. The computer-implemented method of claim 4, wherein the device operates in a data communications network having a latency that is higher than a latency of the low latency data communications network in which the computer system operates.

6. The computer-implemented method of claim 5, wherein the computer system is a server computer operating in the low latency data communications network, the low latency data communications network comprising a local area network.

7. The computer-implemented method of claim 6, wherein the server computer is part of a data center that is configured to support an e-commerce Web site.

8. The computer-implemented method of claim 7, wherein the data communications network comprises an internet.

9. A computer-implemented method for proactively retransmitting data packets in a low latency data communications network, comprising:
    transmitting, from a computing system, a packet to an outgoing network edge component with instructions to deliver the packet to a device, wherein the computing system and the outgoing network edge component are located within the low latency data communications network and wherein the device is located outside of the low latency data communications network;
    querying, from the computing system, the outgoing network edge component for an acknowledgement number for a last packet the outgoing network edge component sent to the device in response to an expiration of a specified time period;
    receiving, at the computing system, a query response from the outgoing network edge component;
    in response to determining that the query response does not comprise a correct acknowledgment number for the packet,
    inferring that the packet has been lost in transit to the outgoing network edge component, and
    retransmitting the packet, from the computing system, to the outgoing network edge component.

10. The computer-implemented method of claim 9, further comprising:
    determining that an acknowledgement message has been received, the acknowledgment message indicating that the packet was successfully delivered to the device;
    in response to determining that the acknowledgment message has not been received, determining that a retransmit timeout has been reached; and
    in response to determining that the retransmit timeout has been reached, retransmitting the packet to the outgoing network edge component;
    wherein querying the outgoing network edge component for the acknowledgement number for the last packet the outgoing network edge component sent to the device comprises querying the outgoing network edge component for the acknowledgement number for the last packet the outgoing network edge component sent to the device in response to determining that the retransmit timeout has not been reached.

11. The computer-implemented method of claim 9, wherein the outgoing network edge component comprises an egress server configured to handle a flow of outgoing data packets from the low latency data communications network.

12. The computer-implemented method of claim 11, wherein the egress server comprises an acknowledgment record configured to store acknowledgment numbers of data packets received from the computer system.

13. The computer-implemented method of claim 9, wherein the computer system comprises at least one of the following: a Web server, an application server, or a data storage server.

14. A non-transitory computer-readable storage medium having computer-executable instructions stored thereupon which, when executed by a computer, cause the computer to perform operations, comprising:
    transmitting a packet to an outgoing network edge component with instructions to deliver the packet to a device, wherein the computer and the outgoing network edge component are located within the low latency data communications network and wherein the device is located outside of the low latency data communications network;
    querying the outgoing network edge component for an acknowledgement number for a last packet the outgoing network edge component sent to the device in response to an expiration of a specified time period;
    receiving a query response from the outgoing network edge component;
    in response to determining that the query response does not comprise a correct acknowledgment number for the packet,
    inferring that the packet has been lost in transit to the outgoing network edge component, and
    retransmitting the packet to the outgoing network edge component.

15. The non-transitory computer-readable storage medium of claim 14, further comprising:
    determining that an acknowledgement message has been received, the acknowledgment message indicating that the packet was successfully delivered to the device;
    in response to determining that the acknowledgment message has not been received, determining that a retransmit timeout has been reached; and
    in response to determining that the retransmit timeout has been reached, retransmitting the packet to the outgoing network edge component;
    wherein querying the outgoing network edge component for the acknowledgement number for the last packet the outgoing network edge component sent to the device comprises querying the outgoing network edge component for the acknowledgement number for the last packet the outgoing network edge component sent to the device in response to determining that the retransmit timeout has not been reached.

16. The non-transitory computer-readable storage medium of claim 14, wherein the device operates in a data communications network having a latency that is higher than a latency of the low latency data communications network in which the computer operates.

17. The non-transitory computer-readable storage medium of claim 14, wherein the computer is a server computer operating in the low latency data communications network, the low latency data communications network comprising a local area network.

18. The non-transitory computer-readable storage medium of claim 17, wherein the server computer is part of a data center that is configured to support an e-commerce Web site.

19. The non-transitory computer-readable storage medium of claim 14, wherein the data communications network comprises an internet.

20. The non-transitory computer-readable storage medium of claim 14, wherein the outgoing network edge component comprises an egress server configured to handle a flow of outgoing data packets from the low latency data communications network.

* * * * *